(12) United States Patent
Okada et al.

(10) Patent No.: US 8,142,934 B2
(45) Date of Patent: Mar. 27, 2012

(54) POSITIVE ELECTRODE FOR NON-AQUEOUS ELECTROLYTIC SECONDARY CELL AND NON-AQUEOUS ELECTROLYTIC SECONDARY CELL

(75) Inventors: Shigeto Okada, Fukuoka (JP); Jun-Ichi Yamaki, Kasugai (JP); Tomoko Iwanaga, Fukuoka (JP); Michio Takahashi, Nagoya (JP); Hiroyuki Katsukawa, Niwa-Gun (JP)

(73) Assignees: Kyushu University, Fukuoka (JP); NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/390,757

(22) Filed: Mar. 28, 2006

(65) Prior Publication Data

US 2006/0222946 A1    Oct. 5, 2006

(30) Foreign Application Priority Data

Mar. 30, 2005    (JP) .................... 2005-099096

(51) Int. Cl.
*H01M 4/13*    (2010.01)
(52) U.S. Cl. .................................. 429/231.95
(58) Field of Classification Search .......... 429/224
See application file for complete search history.

(56) References Cited

U.S. PATENT DOCUMENTS

| | | | | |
|---|---|---|---|---|
| 6,514,640 B1 * | 2/2003 | Armand et al. | ............ | 429/231.1 |
| 7,060,238 B2 * | 6/2006 | Saidi et al. | .................... | 423/306 |
| 2002/0012842 A1 * | 1/2002 | Tsujimoto et al. | ............ | 429/224 |
| 2002/0094481 A1 * | 7/2002 | Goto et al. | .................. | 429/218.1 |
| 2004/0002002 A1 * | 1/2004 | Mizuta et al. | ................. | 429/188 |
| 2004/0096743 A1 * | 5/2004 | Okae et al. | .................. | 429/231.1 |
| 2004/0197654 A1 * | 10/2004 | Barker et al. | ............... | 429/218.1 |
| 2004/0202930 A1 * | 10/2004 | Armand et al. | ............... | 429/213 |
| 2005/0221188 A1 * | 10/2005 | Takami et al. | ........... | 429/231.95 |
| 2007/0026315 A1 * | 2/2007 | Lampe-Onnerud et al. | .. | 429/224 |

FOREIGN PATENT DOCUMENTS

| | | | |
|---|---|---|---|
| JP | 2000-215884 | | 8/2000 |
| JP | 2001-143705 | | 5/2001 |
| JP | 2002216755 A | * | 8/2002 |
| JP | 2002-279989 | * | 9/2002 |
| JP | 2003-197180 | | 7/2003 |
| JP | 2004-047180 | | 2/2004 |
| JP | 2005-123024 A1 | | 5/2005 |

OTHER PUBLICATIONS

IPDL machine translation of JP 2002-279989.*

* cited by examiner

*Primary Examiner* — Barbara Gilliam
*Assistant Examiner* — Maria J Laios
(74) *Attorney, Agent, or Firm* — Burr & Brown

(57) ABSTRACT

A positive electrode for a non-aqueous electrolytic secondary cell and a non-aqueous electrolytic secondary cell are provided, which exhibit a high potential in a 4 V region, and have a high capacity, safety, excellent cycle characteristics, and satisfactory high-temperature characteristics. The positive electrode active material is a mixture of an olivine type lithium manganese phosphate and a spinel type lithium manganate.

6 Claims, 1 Drawing Sheet

200
POSITIVE ELECTRODE FOR NON-AQUEOUS ELECTROLYTIC SECONDARY CELL AND NON-AQUEOUS ELECTROLYTIC SECONDARY CELL

BACKGROUND OF THE INVENTION

1. Field of the Invention

The present invention relates to a positive electrode for a non-aqueous electrolytic secondary cell and a non-aqueous electrolytic secondary cell which have a high potential, a high capacity, safety, and an excellent cycle characteristic.

2. Description of the Related Art

In recent years, since the non-aqueous electrolytic secondary cell represented by a lithium secondary cell is smallest, lightest, chargeable and dischargeable with a high capacity, the cell is put to practical use as a power supply of a cellular phone demanded to be small-sized and light-weight, a portable electronic device such as a personal computer or a video camera, or a communication device. The cell is expected as a cell for driving a motor of an electric vehicle (EV) or a hybrid electric vehicle (HEV), or as means for storing power at night for effective use of electricity.

Typical examples of a positive electrode material of the non-aqueous electrolytic secondary cell mainly include lithium transition metal compound oxides such as lithium cobalt oxide ($LiCoO_2$), lithium nickel oxide ($LiNiO_2$), and lithium manganate ($LiMn_2O_4$).

Here, a high charge and discharge capacity is obtained in the cell using lithium cobalt oxide or lithium nickel oxide. However, since thermal stability of lithium cobalt oxide or lithium nickel oxide itself is low, safety of the cell is not sufficient when the cell is exposed to the abnormal conditions, for example, in the case that heat is generated abnormally. Especially, the cell wherein lithium nickel oxide is used as a positive electrode does not function well when the amount of desorbed Li from lithium nickel oxide increases. In addition, there is a problem that released oxygen from lithium nickel oxide is apt to react with an electrolysis solution, and in the worst case the cell will be ruptured. Moreover, lithium cobalt oxide has a problem in that the cell becomes very expensive in the case where a large-sized cell is prepared, because a producing area of cobalt as a raw material is limited, and the resource amount thereof is little. There is also a problem in that the output density of lithium cobalt oxide is small compared with that of lithium manganate.

On the other hand, in case of the cell using lithium manganate, a large-sized cell can be inexpensively prepared since there is mainly used as a positive electrode material spinel type lithium manganate whose resource amount is ample, which is inexpensive and which is excellent in safety. Thus, the safety even under the conditions that the disorder is caused in the cell can be improved compared with lithium cobalt oxide and lithium nickel oxide.

However, since the cell using lithium manganate has a smaller charge and discharge capacity as compared with the cell using lithium cobalt oxide or lithium nickel oxide, there are problems in that sufficient cell characteristics cannot be obtained and in that the capacity at high temperature decreases remarkably. As one of causes for the drop in capacity, the following phenomenon is supposedly generated in a cell system. That is, in the non-aqueous electrolytic secondary cell prepared using, for example, an $LiPF_6$-based electrolysis solution as an electrolysis solution, HF is generated in the system especially at a high temperature. Accordingly, it is considered that a part of Mn is eluted from lithium manganate, and this phenomenon deteriorates the positive electrode active material and affects adversely on a negative electrode active material. As a result, it is supposed that there is caused a disadvantage such as the above-described capacity drop at high temperature.

To solve the above-described problem, a method of substituting a part of Mn by another metal element and a method of coating the surface of lithium manganate has been investigated. In recent years, there has been proposed a method of mixing lithium cobalt oxide or lithium nickel oxide with lithium manganate to obtain a positive electrode active material of the non-aqueous electrolytic secondary cell (See, for example, JP-A-2003-197180, JP-A-2001-143705, and JP-A-2000-215884). However, under the present circumstances, a sufficient effect has not been necessarily achieved.

Moreover, in recent years, investigations have been made with respect to using a phosphate compound having an olivine structure, represented by $LiFePO_4$ as the positive electrode active material of the non-aqueous electrolytic secondary cell, and the compound is noted as the next-generation positive electrode active material for the non-aqueous electrolytic secondary cell. Phosphorus (P) and oxygen (O) in the phosphate compound have a very strong covalent bond. Even in a case where the amount of desorbed Li increases as in lithium nickel oxide described above, oxygen (O) is not easily liberated from phosphorus (P). Therefore, oxygen (O) hardly reacts with the electrolysis solution, and the thermal stability is very high. In the phosphate compound, $LiFePO_4$ has a capacity of 3 V whereas the olivine type lithium manganese phosphate ($LiMnPO_4$) has a capacity of 4 V, which corresponds to about 1.5 times capacity of the spinel type lithium manganate per molar ratio of Mn. However, since the phosphate compound itself has low electric conductivity, the compound has a problem in that the inner resistance of the cell increases, and the rate characteristics remarkably decrease in the case where the cell is prepared using the phosphate compound alone as the positive electrode active material.

SUMMARY OF THE INVENTION

The present invention has been developed in view of the above-described problem of the conventional technology, and an object is to provide a positive electrode for a non-aqueous electrolytic secondary cell and a non-aqueous electrolytic secondary cell which exhibit a high potential in a 4 V region and which have a high capacity, safety, excellent cycle characteristics, and satisfactory high-temperature characteristics.

To achieve the above-described object, the present invention provides the following non-aqueous electrolytic secondary cell.

According to a first aspect of the present invention, a positive electrode for a non-aqueous electrolytic secondary cell is provided, wherein the positive electrode active material is a mixture of an olivine type lithium manganese phosphate and a spinel type lithium manganate.

According to a second aspect of the present invention, the positive electrode for the non-aqueous electrolytic secondary cell according to the first aspect is provided, wherein the general formula of the olivine type lithium manganese phosphate is represented by $LiM1_xMn_{1-x}PO_4$ (M1: at least one metal element other than manganese, $0 \leq x$ (substituted amount) $\leq 0.5$).

According to a third aspect of the present invention, the positive electrode for the non-aqueous electrolytic secondary cell according to the second aspect is provided, wherein M1 is at least one metal element selected from the group consisting of Li, Fe, Ni, Mg, Zn, Co, Cr, Al, B, V, Si, Sn, Nb, Ta, Cu, Mo, and W.

According to a fourth aspect of the present invention, the positive electrode for the non-aqueous electrolytic secondary cell according to any one of the first to third aspects is provided, wherein the general formula of the spinel type lithium manganese is represented by $LiM2_xMn_{2-x}O_4$ (M2: at least one metal element other than manganese, $0 \leq x$ (substituted amount)$\leq 0.5$).

According to a fifth aspect of the present invention, the positive electrode for the non-aqueous electrolytic secondary cell according to the fourth aspect is provided, wherein M2 is at least one metal element selected from the group consisting of Li, Fe, Ni, Mg, Zn, Co, Cr, Al, B, V, Si, Sn, Nb, Ta, Cu, Mo, Ti, and W.

According to a sixth aspect of the present invention, the positive electrode for the non-aqueous electrolytic secondary cell according to any one of the second to fifth aspects is provided, wherein the substituted amount is in a range of $0 \leq x \leq 0.3$.

According to a seventh aspect of the present invention, the positive electrode for the non-aqueous electrolytic secondary cell according to any one of the first to sixth aspects is provided, wherein a mixed ratio of the olivine type lithium manganese phosphate in the positive electrode active material is in a range of 10 to 90 mass %.

According to an eighth aspect of the present invention, a non-aqueous electrolytic secondary cell is provided, comprising a positive electrode containing a positive electrode active material capable of inserting and desorbing a lithium ion, a negative electrode having a negative electrode active material capable of inserting and desorbing the lithium ion, and a non-aqueous solvent including an electrolyte. The positive electrode is the positive electrode for the non-aqueous electrolytic secondary cell according to any one of the first to seventh aspects.

According to a ninth aspect of the present invention, the non-aqueous electrolytic secondary cell according to the eighth aspect is provided, wherein the electrolyte contains at least one of $LiPF_6$, $LiBF_4$, and $LiClO_4$.

According to a tenth aspect of the present invention, the non-aqueous electrolytic secondary cell according to the eighth or ninth aspect is provided, wherein the negative electrode active material is a highly graphitized carbon material or hard carbon.

According to the present invention, the positive electrode for the non-aqueous electrolytic secondary cell, and the non-aqueous electrolytic secondary cell exhibit a high potential in a 4 V region, and have a high capacity, safety, excellent cycle characteristics, and excellent high-temperature characteristics.

DETAILED DESCRIPTION OF THE INVENTION

Figure 1:
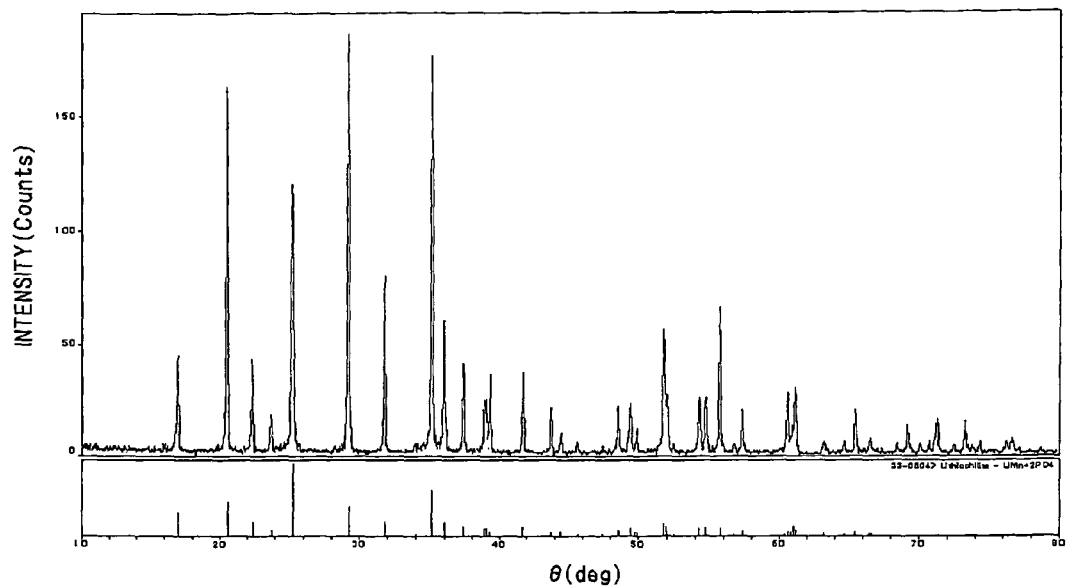
FIG. 1 is an X-ray diffraction diagram showing an X-ray profile of the olivine type $LiMnPO_4$ to be used as one of the positive electrode active materials of the present invention.

There will be described hereinafter in detail a positive electrode for a non-aqueous electrolytic secondary cell and a non-aqueous electrolytic secondary cell in the present invention. The present invention is not restrictively interpreted, and can be variously altered, modified, and improved based on knowledge of any person skilled in the art without departing from the scope of the present invention.

The main characteristics of the positive electrode for the non-aqueous electrolytic secondary cell of the present invention lie in that a positive electrode active material of the non-aqueous electrolytic secondary cell is constituted by mixing olivine type lithium manganese phosphate with spinel type lithium manganate.

Here, the olivine type lithium manganese phosphate and the spinel type lithium manganate mainly constituting the positive electrode active material for use in the present invention are both positive electrodes containing manganese as a core metal, and having an equal discharge voltage. However, when the olivine type lithium manganese phosphate is mixed with the spinel type lithium manganate, it is possible to complement a low rate characteristic, which is a disadvantage of the olivine type lithium manganese phosphate with a high rate characteristic, which is an advantage of the spinel type lithium manganate. It is also possible to complement a small theoretical capacity and a short storage life at a high temperature which are disadvantages of spinel type lithium manganate with a large theoretical capacity and satisfactory high-temperature characteristics, which are advantages of the olivine type lithium manganese phosphate. Therefore, when a mixed ratio of the two is simply changed, it is possible to freely tune a selection of a large capacity type or a high rate type as the performance of the positive electrode for the non-aqueous electrolytic secondary cell without changing the voltage curve during charging and discharging.

Moreover, in case of the positive electrode active materials used heretofore, there has been a fear that the separation of different metals for recycling is troublesome and costly. However, since the positive electrode active material for use in the present invention is a material containing manganese as the core metal (olivine type lithium manganese phosphate and spinel type lithium manganate), the material cost is small. In addition, it is expected that the separation costs for recycling can be reduced.

The general formula of olivine type lithium manganese phosphate for use in the present invention is preferably represented by $LiM1_xMn_{1-x}PO_4$ (M1: at least one metal element other than manganese, $0 \leq x$ (substituted amount)$\leq 0.5$, more preferably $0 \leq x \leq 0.3$). This is because when the substituted amount x is larger than 0.5, the formation of a hetero-phase during the synthesis of the positive electrode active material is recognized in a powder X-ray diffraction chart (XRD), and a single-phase substance cannot be easily obtained. Therefore, in the cell, since such a hetero-phase only increases the weight of the positive electrode active material and does not contribute to cell reaction, the generation of the hetero-phase is preferably prevented.

At this time, M1 described above is preferably at least one metal element selected from the group consisting of Li, Fe, Ni, Mg, Zn, Co, Cr, Al, B, V, Si, Sn, Nb, Ta, Cu, Mo, and W. This is because the crystal structure of the olivine type lithium manganese phosphate can further be stabilized.

Moreover, the general formula of spinel type lithium manganese for use in the present invention is preferably represented by $LiM2_xMn_{2-x}O_4$ (M2: at least one metal element other than manganese, $0 \leq x$ (substituted amount)$\leq 0.5$ (more preferably $0 \leq x \leq 0.3$)).

At this time, M2 described above is preferably at least one metal element selected from the group consisting of Li, Fe, Ni, Mg, Zn, Co, Cr, Al, B, V, Si Sn, Nb, Ta, Cu, Mo, Ti, and W, in that the crystal structure of lithium manganate can further be stabilized.

In the positive electrode for the non-aqueous electrolytic secondary cell of the present invention, the mixed ratio of the olivine type lithium manganese phosphate in the present positive electrode active material is in a range of 10 to 90 mass %, preferably 20 to 80 mass %, more preferably 30 to 70 mass %.

In the case where the mixed ratio of the olivine type lithium manganese phosphate in the present positive electrode active material is less than 10 mass %, it is not possible to complement a small theoretical capacity and a short high-temperature storage life, which are disadvantages of the spinel type lithium manganate. On the other hand, in the case where the mixed ratio of the olivine type lithium manganese phosphate in the present positive electrode active material is above 90 mass %, it is not possible to complement a low rate characteristic which is a disadvantage of the olivine type lithium manganese phosphate with a high rate characteristic, which is an advantage of the spinel type lithium manganate.

Next, there will be described a basic constitution of a non-aqueous electrolytic secondary cell in the present invention. In the present invention, the non-aqueous electrolytic secondary cell includes a positive electrode containing a positive electrode active material capable of inserting and desorbing a lithium ion, a negative electrode having a negative electrode active material capable of inserting and desorbing the lithium ion, and a non-aqueous solvent including an electrolyte.

In the present invention, the spinel type lithium manganate, which is one of the positive electrode active materials for use in the positive electrode for the non-aqueous electrolytic secondary cell, can be obtained as a single-phase product, when a mixture of salts and/or oxides of elements is adjusted into a predetermined ratio and is fired in an oxidizing atmosphere at 600 to 1000° C. for five to 50 hours. Here, the oxidizing atmosphere generally refers to an atmosphere having such an oxygen partial pressure as to allow a sample in a furnace to cause an oxidizing reaction. The firing temperature is preferably 600 to 1000° C. In the case where the firing temperature is lower than 600° C., a peak indicating a residual material is observed in an XRD chart of the fired material. For example, in the case where lithium carbonate ($Li_2CO_3$) is used as a lithium source, a peak of $Li_2CO_3$ is observed, and the single-phase product is not easily obtained. Even if the single-phase product is obtained, the crystallinity is low. On the other hand, in the case where the firing temperature is higher than 1000° C., oxygen deficiency easily occurs. Alternatively, a high-temperature crystal phase is easily generated, in addition to a targeted crystal-system compound, and the single-phase product is not easily obtained.

Moreover, the firing step may be performed once or twice or more. However, to improve the crystallinity further, firing is more preferably performed twice or more. In this case, to perform the next-stage firing, the firing temperature is preferably set to be higher than that of the previous stage, and the firing conditions for the final firing are set to an oxidizing atmosphere at 600 to 1000° C. for five to 50 hours. For example, in the case where the firing is performed twice, a peak shape in an XRD chart protrudes more sharply in a product obtained by setting a temperature of the second firing to be not less than that of the first firing in performing synthesis than in a product obtained by performing the firing once by use of conditions of the firing temperature and the time of the second firing. The crystallinity is improved.

The other positive electrode active material for the present positive electrode active material is the olivine type lithium manganese phosphate, which is obtained as a single-phase product by firing a mixture of salts and/or oxides of elements adjusted into a predetermined ratio in a gloved box having an argon atmosphere on firing conditions of an oxidizing atmosphere at 400° C. to 900° C. for five to 50 hours. Thereafter, the mixture is quenched. In the case where the firing temperature is below 400° C., a peak indicating a residual material, or a peak indicating a decomposed product is observed in an XRD chart of a fired product, and the single-phase product is not easily obtained. On the other hand, in the case where the firing temperature is higher than 900° C., a high-temperature crystal phase is easily formed in addition to a targeted crystal-system compound, and the single-phase product is not easily obtained.

There is not any special restriction on the salt of each element, but it is preferable to use an inexpensive salt having a high purity as a raw material. Therefore, it is preferable to use carbonate, hydroxide, or organic acid salt that does not generate any toxic decomposing gas during temperature rise or firing. It should be noted, however, that this does not mean that a nitrate, hydrochloride, sulfate or the like are excluded from the salt.

There is not any special restriction on the negative electrode active material for use in the present invention, and various heretofore known materials may be used. For example, there may be used an amorphous carbonaceous material such as soft carbon or hard carbon, or a highly graphitized carbon material such as artificial graphite or natural graphite.

Moreover, examples of the non-aqueous solvent for use in the present invention, as an organic solvent preferably include: a carbonate-based solvent such as ethylene carbonate (EC), diethyl carbonate (DEC), dimethyl carbonate (DMC), or propylene carbonate (PC); a single solvent such as γ-butyrolactone, tetrahydrofuran, or acetonitrile; or a mixed solvent.

Furthermore, examples of the electrolyte for use in the present invention include lithium complex fluorine compounds such as lithium phosphate fluoride ($LiPF_6$) and lithium boron fluoride ($LiBF_4$); lithium halide such as lithium perchlorate ($LiClO_4$); and lithium bis(oxalate)borate (LiBOB). One or two or more types of electrolytes are dissolved in the solvent for use. Especially, it is preferable to use $LiPF_6$, which is not easily oxidized or decomposed and which has high conductivity of the non-aqueous electrolysis solution.

In the present invention, examples of a cell structure of the non-aqueous electrolytic secondary cell include: a coin-like cell in which a separator is disposed between a positive electrode active material and a negative electrode active material formed into plate shapes, and filled with the electrolysis solution; and a cylindrical or a box-like cell using an electrode member constituted by winding or laminating, via the separator, a positive electrode plate obtained by coating the surface of a metal foil with the positive electrode active material and a negative electrode plate similarly obtained by coating the surface of the metal foil with the negative electrode active material.

EXAMPLES

The present invention will be described in more detail in accordance with examples, but the present invention is not limited to these examples.

Synthesis of Lithium Manganese Phosphate

As starting materials, $Li_2CO_3$, $P_2O_5$, and $Mn_2O_3$ powders were used. The materials were weighed and mixed so as to obtain compositions of $LiMnPO_4$ and $Li_{1.1}Mn_{0.9}PO_4$ respectively in a gloved box kept under an argon atmosphere. Next, the respective mixtures were calcined in an oxidizing atmosphere at 500° C. for 15 hours, thereafter fired at 800° C. for 48 hours, and quenched to thereby synthesize lithium manganese phosphate having an olivine structure. The resultant samples were both identified as Pmnb rhombic lithium manganese phosphate having an ICDD33-0803 olivine structure as shown in an X-ray diffraction diagram of FIG. 1.

Moreover, as to $LiM1_xMn_{1-x}PO_4$ (M1 denotes at least one metal element other than manganese and x has the same meaning as mentioned above), the following substitution species M1 was used. Among Ni, Fe, and Co belonging to the group VIII of the periodic table, Ni was used as a representative species. Among Cr, Mo, and W belonging to the group $VI_B$ of the periodic table, Cr was used as a representative species. As to Al and B belonging to the group $III_A$ of the periodic table, Al was used as a representative species. Among V, Nb, and Ta belonging to the group $V_B$ of the periodic table, V was used as a representative species. As to Si and Sn belonging to the group $IV_A$ of the periodic table, Sn was used as a representative species, and Li, Mg, Zn, or Ti was used as the other substitution element. Accordingly, in addition to the above-described starting materials, $LiMn_{0.9}Ni_{0.1}PO_4$ was synthesized using NiO powder; $LiMn_{0.9}Mg_{0.1}PO_4$ was synthesized using MgO powder; $LiMn_{0.9}Zn_{0.1}PO_4$ was synthesized using ZnO powder; $LiMn_{0.9}Cr_{0.1}PO_4$ was synthesized using $Cr_3O_4$; $LiMn_{0.9}Al_{0.1}PO_4$ was synthesized using $Al_2O_3$; $LiMn_{0.9}V_{0.1}PO_4$ was synthesized using $V_2O_5$; $LiMn_{0.9}Sn_{0.1}PO_4$ was synthesized using $SnO_2$; and $LiMn_{0.9}Ti_{0.1}PO_4$ was synthesized using $TiO_2$ on similar conditions, respectively.

Synthesis of Lithium Manganate

Figure 2:
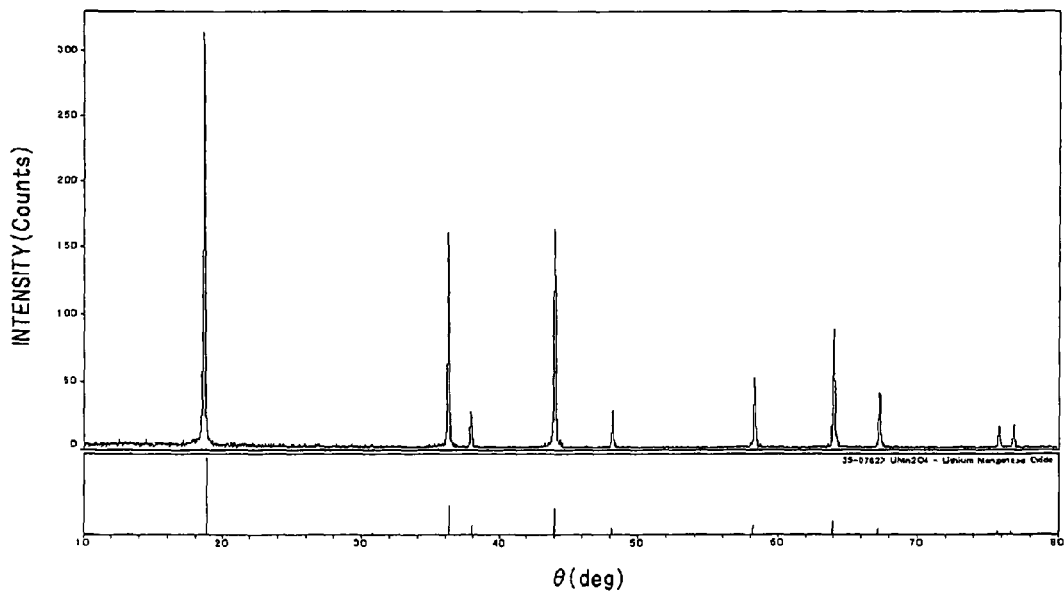
FIG. 2 is an X-ray diffraction diagram showing an X-ray profile of the spinel type $LiMn_2O_4$ to be used as one of the positive electrode active materials of the present invention.

As starting materials, commercially available $Li_2CO_3$ and $MnO_2$ powders were used. The materials were weighed and mixed so as to obtain compositions of $LiMn_2O_4$ and $Li_{1.1}Mn_{1.9}O_4$, respectively. Next, the respective mixtures were fired in an oxidizing atmosphere at 800° C. for 24 hours, and lithium manganate having a spinel structure was synthesized. The resultant samples were both identified as Fd3m cubic lithium manganate having an ICDD35-0782 spinel structure as shown in an X-ray diffraction diagram of FIG. 2.

Moreover, as to $LiM2_xMn_{2-x}O_4$ (M2 denotes at least one metal element other than manganese and x has the same meaning as mentioned above), the following substitution species M2 was used. Among Ni, Fe, and Co belonging to the group VIII of the periodic table, Ni was used as a representative species. Among Cr, Mo, and W belonging to the group $VI_B$ of the periodic table, Cr was used as a representative species. As to Al and B belonging to the group $III_A$ of the periodic table, Al was used as a representative species. Among V, Nb, and Ta belonging to the group $V_B$ of the periodic table, V was used as a representative species. As to Si and Sn belonging to the group $IV_A$ of the periodic table, Sn was used as a representative species, and Li, Mg, Zn, Ti, or Cu was used as other substitution element. Accordingly, in addition to the above-described starting materials, $LiMn_{1.9}Ni_{0.1}O_4$ was synthesized using NiO powder; $LiMn_{1.9}Mg_{0.1}O_4$ was synthesized using MgO powder; $LiMn_{1.9}Zn_{0.1}O_4$ was synthesized using ZnO powder; $LiMn_{1.9}Cr_{0.1}O_4$ was synthesized using $Cr_3O_4$; $LiMn_{1.9}Al_{0.1}O_4$ was synthesized using $Al_2O_3$; $LiMn_{1.9}V_{0.1}O_4$ was synthesized using $V_2O_5$; $LiMn_{1.9}Sn_{0.1}O_4$ was synthesized using $SnO_2$; $LiMn_{1.9}Ti_{0.1}O_4$ was synthesized using $TiO_2$; and $LiMn_{1.9}Cu_{0.1}O_4$ was synthesized using CuO under similar conditions, respectively.

Preparation 1 of Positive Electrode Active Material

Each of synthesized lithium manganese phosphates was dry-mixed with each of synthesized lithium manganates in the ratios (mass %), respectively shown in Table 1, and each of positive electrode active materials was prepared.

TABLE 1

|  | Mixed ratio (mass %) of lithium manganese phosphate/lithium manganate |
|---|---|
| Example 1 | 10/90 |
| Example 2 | 20/80 |
| Example 3 | 30/70 |
| Example 4 | 50/50 |
| Example 5 | 70/30 |
| Example 6 | 80/20 |
| Example 7 | 90/10 |
| Comparative Example 1 | 0/100 |
| Comparative Example 2 | 100/0 |

Preparation 2 of Positive Electrode Active Material

Synthesized $LiM1_xMn_{1-x}PO_4$ (Positive electrode Active Material 1) and $LiM2_xMn_{2-x}O_4$ (Positive electrode Active Material 2) were dry-mixed so as to obtain blends in ratios (mass %) shown in Tables 5 to 7, and positive electrode active materials were prepared.

Preparation of Cell

The above-described positive electrode material was used as the positive electrode active material, and an acetylene black powder as a conductive material and polyvinylidene fluoride as a binder were added and mixed at a mass ratio of 70:25:5. The resultant mixture was pressed and formed into a disc shape having a diameter of 10 mmφ at a pressure of 300 kg/cm² to obtain a positive electrode. Next, $LiPF_6$ as an electrolyte was dissolved in an organic solvent obtained by mixing EC and DEC at an equal volume ratio (1:1) so as to obtain a concentration of 1 mol/L, thereby preparing an electrolysis solution. Coin cells were prepared using the electrolysis solution, a negative electrode made of carbon, a separator for separating the positive electrode and the negative electrode, and the positive electrode prepared as described above (Examples 1 to 31, Comparative Examples 1 and 2).

Evaluation of Room-Temperature Initial Charge Capacity

After the prepared coin cells (Examples 1 to 7, Comparative Examples 1 and 2) were charged up to 4.5 V with a constant current at rates of 0.02, 0.1, and 0.5 mA/cm² in accordance with the capacity of the positive electrode active material at room temperature, the discharge capacities in each case was obtained as the power was discharged from the cells down to 3 V at an equal rate with a constant current. Results are shown in Table 2.

TABLE 2

|  | Initial discharge capacity | | |
|---|---|---|---|
|  | 0.02 mA/cm$^2$ | 0.1 mA/cm$^2$ | 0.5 mA/cm$^2$ |
| Example 1 | 118 mAh/g | 114 mAh/g | 108 mAh/g |
| Example 2 | 116 mAh/g | 113 mAh/g | 107 mAh/g |
| Example 3 | 115 mAh/g | 112 mAh/g | 105 mAh/g |
| Example 4 | 106 mAh/g | 103 mAh/g | 93 mAh/g |
| Example 5 | 100 mAh/g | 98 mAh/g | 82 mAh/g |
| Example 6 | 90 mAh/g | 85 mAh/g | 70 mAh/g |
| Example 7 | 80 mAh/g | 65 mAh/g | 40 mAh/g |
| Comparative Example 1 | 120 mAh/g | 115 mAh/g | 110 mAh/g |
| Comparative Example 1 | 30 mAh/g | 20 mAh/g | 10 mAh/g |

Evaluation of High-Temperature Initial Charge Capacity

Next, the coin cells (Examples 1 to 7, Comparative Examples 1 and 2) prepared in the same manner as in the above examples were disposed in a thermostat chamber set at an inner temperature of 60° C., and a discharge capacity was obtained during a charging and discharging test performed on the same test conditions as described above. Results are shown in Table 3.

TABLE 3

|  | Initial discharge capacity | | |
|---|---|---|---|
|  | 0.02 mA/cm$^2$ | 0.1 mA/cm$^2$ | 0.5 mA/cm$^2$ |
| Example 1 | 125 mAh/g | 116 mAh/g | 111 mAh/g |
| Example 2 | 128 mAh/g | 118 mAh/g | 112 mAh/g |
| Example 3 | 130 mAh/g | 120 mAh/g | 114 mAh/g |
| Example 4 | 140 mAh/g | 125 mAh/g | 115 mAh/g |
| Example 5 | 150 mAh/g | 130 mAh/g | 116 mAh/g |
| Example 6 | 153 mAh/g | 135 mAh/g | 117 mAh/g |
| Example 7 | 155 mAh/g | 137 mAh/g | 119 mAh/g |
| Comparative Example 1 | 120 mAh/g | 115 mAh/g | 110 mAh/g |
| Comparative Example 2 | 160 mAh/g | 140 mAh/g | 120 mAh/g |

Evaluation 1 of Cycle Characteristic

Next, the coin cells (Examples 1 to 7, Comparative Examples 1 and 2) prepared in the same manner as in the above examples were disposed in thermostat chambers set at an inner temperature of 60° C. and room temperature, respectively, 100 charge and discharge cycles were performed with a charge and discharge current of 0.1 mA/cm$^2$ on voltage regulating conditions of 3 to 4.5 V, and discharge capacity retention ratios (%) after elapse of 100 cycles were measured. It is to be noted that the "discharge capacity retention ratio (%)" in the present evaluation is a numeric value (%) obtained by dividing the discharge capacity after the elapse of 100 cycles by an initial discharge capacity. The results are shown in Table 4.

TABLE 4

|  | Room temperature | | 60° C. | |
|---|---|---|---|---|
|  | 100-th cycle discharge capacity (mAh/g) | Capacity retention ratio (%) | 100-th cycle discharge capacity (mAh/g) | Capacity retention ratio (%) |
| Exam. 1 | 91 mAh/g | 80 | 58 mAh/g | 50 |
| Exam. 2 | 91 mAh/g | 81 | 71 mAh/g | 60 |
| Exam. 3 | 92 mAh/g | 82 | 76 mAh/g | 63 |
| Exam. 4 | 85 mAh/g | 83 | 85 mAh/g | 68 |
| Exam. 5 | 85 mAh/g | 87 | 91 mAh/g | 70 |
| Exam. 6 | 75 mAh/g | 88 | 108 mAh/g | 80 |
| Exam. 7 | 59 mAh/g | 90 | 114 mAh/g | 83 |
| Comp. Exam. 1 | 105 mAh/g | 91 | 48 mAh/g | 42 |
| Comp. Exam. 2 | 15 mAh/g | 77 | 126 mAh/g | 90 |

Evaluation 2 of Cycle Characteristic

Moreover, coin cells (Examples 8 to 31) prepared in the same manner as in the above examples were disposed in a thermostat chamber set at an inner temperature of 60° C., 100 charge and discharge cycles were performed with a charge and discharge current of 0.1 mA/cm$^2$ on voltage regulating conditions of 3 to 4.5 V, and discharge capacity retention ratios (%) after the elapse of 100 cycles were measured. The results are shown in Tables 5 to 7.

TABLE 5

| | Positive electrode active substance 1 | Positive electrode active substance 2 | Mixture ratio (mass %) | 60° C. Capacity retention ratio (%) |
|---|---|---|---|---|
| Exam. 8  | $LiMnPO_4$ | $Li_{1.1}Mn_{1.9}O_4$ | 50/50 | 76 |
| Exam. 9  | $LiMnPO_4$ | $LiMn_{1.9}Ni_{0.1}O_4$ | 50/50 | 78 |
| Exam. 10 | $LiMnPO_4$ | $LiMn_{1.9}Mg_{0.1}O_4$ | 50/50 | 79 |
| Exam. 11 | $LiMnPO_4$ | $LiMn_{1.9}Zn_{0.1}O_4$ | 50/50 | 81 |
| Exam. 12 | $LiMnPO_4$ | $LiMn_{1.9}Cr_{0.1}O_4$ | 50/50 | 76 |
| Exam. 13 | $LiMnPO_4$ | $LiMn_{1.9}Al_{0.1}O_4$ | 50/50 | 84 |
| Exam. 14 | $LiMnPO_4$ | $LiMn_{1.9}V_{0.1}O_4$ | 50/50 | 80 |
| Exam. 15 | $LiMnPO_4$ | $LiMn_{1.9}Sn_{0.1}O_4$ | 50/50 | 78 |
| Exam. 16 | $LiMnPO_4$ | $LiMn_{1.9}Ti_{0.1}O_4$ | 50/50 | 88 |
| Exam. 17 | $LiMnPO_4$ | $LiMn_{1.9}Cu_{0.1}O_4$ | 50/50 | 88 |

TABLE 6

| | Positive electrode active substance 1 | Positive electrode active substance 2 | Mixture ratio (mass %) | 60° C. Capacity retention ratio (%) |
|---|---|---|---|---|
| Exam. 18 | $Li_{1.1}Mn_{0.9}PO_4$ | $LiMn_2O_4$ | 50/50 | 79 |
| Exam. 19 | $LiMn_{0.9}Ni_{0.1}PO_4$ | $LiMn_2O_4$ | 50/50 | 80 |
| Exam. 20 | $LiMn_{0.9}Mg_{0.1}PO_4$ | $LiMn_2O_4$ | 50/50 | 80 |
| Exam. 21 | $LiMn_{0.9}Zn_{0.1}PO_4$ | $LiMn_2O_4$ | 50/50 | 83 |
| Exam. 22 | $LiMn_{0.9}Cr_{0.1}PO_4$ | $LiMn_2O_4$ | 50/50 | 74 |
| Exam. 23 | $LiMn_{0.9}Al_{0.1}PO_4$ | $LiMn_2O_4$ | 50/50 | 83 |
| Exam. 24 | $LiMn_{0.9}V_{0.1}PO_4$ | $LiMn_2O_4$ | 50/50 | 81 |
| Exam. 25 | $LiMn_{0.9}Sn_{0.1}PO_4$ | $LiMn_2O_4$ | 50/50 | 75 |
| Exam. 26 | $LiMn_{0.9}Ti_{0.1}PO_4$ | $LiMn_2O_4$ | 50/50 | 84 |
| Exam. 27 | $LiMn_{0.9}Cu_{0.1}PO_4$ | $LiMn_2O_4$ | 50/50 | 85 |

TABLE 7

| | Positive electrode active substance 1 | Positive electrode active substance 2 | Mixture ratio (mass %) | 60° C. Capacity retention ratio (%) |
|---|---|---|---|---|
| Exam. 28 | $Li_{1.3}Mn_{0.7}PO_4$ | $LiMn_2O_4$ | 50/50 | 82 |
| Exam. 29 | $Li_{1.5}Mn_{0.5}PO_4$ | $LiMn_2O_4$ | 50/50 | 74 |
| Exam. 30 | $LiMnPO_4$ | $Li_{1.3}Mn_{1.7}O_4$ | 50/50 | 85 |
| Exam. 31 | $LiMnPO_4$ | $Li_{1.5}Mn_{1.5}O_4$ | 50/50 | 77 |

Discussion: Examples 1 to 7, Comparative Examples 1 and 2

As seen from the results of Tables 2 to 4, when the mixed ratio of lithium manganese phosphate to lithium manganate increases, the capacity retention ratio at 60° C. tends to increase as shown in Table 4. On the other hand, as shown in Table 2, when the current value increases at room temperature, the capacity tends to decrease.

Moreover, in a comparison of Comparative Example 1 with Examples 1 to 7, as shown in Table 2, Comparative Example 1 shows the largest initial discharge capacity at room temperature as shown in Table 2, but this comparative example shows the smallest capacity retention ratio at 60° C. as shown in Table 4. On the other hand, in a comparison of Comparative Example 2 with Examples 1 to 7, Comparative Example 2 shows the largest capacity retention ratio at 60° C. as shown in Table 4, and the smallest initial discharge capacity at room temperature as shown in Table 2. This is supposed to be due to characteristics of lithium manganese phosphate and lithium manganate.

It has been confirmed from the above as a general evaluation that when the mixed ratio of lithium manganese phosphate to lithium manganate is 10 to 90 mass %, preferably 20 to 80 mass %, more preferably 30 to 70 mass %, defects of Comparative Examples 1 and 2 are complemented.

Discussion: Examples 8 to 31

As seen from Tables 5 and 6, when a part of Mn of lithium manganese phosphate or lithium manganate is substituted by at least one metal element selected from the group consisting of Li, Fe, Ni, Mg, Zn, Co, Cr, Al, B, V, Si, Sn, Nb, Ta, Cu, Mo, and W, and this is mixed and used in the positive electrode active material, the capacity retention ratio at 60° C. is further improved. The reason for this is that the substituting further stabilizes a crystal structure of lithium manganese phosphate or lithium manganate. It is also considered that the conductivity of the bulk is improved by a mixed valence.

Moreover, it is seen from the result of Table 7 that the substituted amount x of lithium manganese phosphate or lithium manganate is preferably 0.5 or less, more preferably 0.3 or less. The reason is that when the substituted amount by another element increases, the crystal structure is stabilized, but distortion is easily generated in a crystal.

It has been confirmed from the above results that when the defects demonstrated by Comparative Examples 1 and 2 are complemented with the effects shown in Examples 1 to 31, it is possible to obtain a non-aqueous electrolytic secondary cell more suitable for actual use.

In a non-aqueous electrolytic secondary cell of the present invention, there is used a comparatively inexpensive mixed positive electrode active material which is substantially equivalent to lithium cobalt oxide and which has a plateau potential in a 4 V region, and a large discharge capacity. Therefore, the cell according to the present invention can be used as a direct replacement for the conventionally used non-aqueous electrolytic secondary cell having a 4 V region, wherein lithium cobalt oxide is used as a positive electrode active material. Therefore, the present invention is industrially effectively utilized.

What is claimed is:

1. A positive electrode for a non-aqueous electrolytic secondary cell comprising a positive electrode active material including a mixture of olivine lithium manganese phosphate and spinel lithium manganate;
    wherein the olivine lithium manganese phosphate is at least one compound selected from the compounds represented by the general formula $LiM1_xMn_{1-x}PO_4$, where x denotes a substituted amount in a range of $0 \leq x \leq 0.3$, and where M1 is at least one metal element selected from the group consisting of Li, Ni, Mg, Zn, Co, Cr, Al, B, V, Si, Sn, Nb, Ta, Cu, Mo and W;
    wherein the spinel lithium manganate is at least one compound selected from the compounds represented by the general formula $LiM2_xMn_{2-x}O_4$, where M2 is at least one metal element selected from the group consisting of Li, Fe, Ni, Mg, Zn, Co, Cr, Al, B, V, Si, Sn, Nb, Ta, Cu, Mo, Ti, and W, and where x denotes a substituted amount and is within a range of $0 \leq x \leq 0.3$;
    wherein x=0 in one of the olivine lithium manganese phosphate and the spinel lithium manganese when x is greater than 0 in the other one of the olivine lithium manganese phosphate and the spinel lithium manganese; and
    wherein a mixed ratio of the olivine lithium manganese phosphate in the positive electrode active material is in a range of 10 to 90 mass %.

2. The positive electrode for a non-aqueous electrolytic secondary cell according to claim 1, having a 60° C. capacity retention ratio (%) range of 75-88.

3. A non-aqueous electrolytic secondary cell comprising:
    a positive electrode comprising a positive electrode active material capable of inserting and desorbing a lithium ion;
    a negative electrode comprising a negative electrode active material capable of inserting and desorbing the lithium ion; and
    a non-aqueous solvent including an electrolyte;
    wherein the positive electrode comprises a mixture of olivine lithium manganese phosphate and spinel lithium manganate, and the olivine lithium manganese phosphate is at least one compound selected from the compounds represented by the general formula $LiM1_xMn_{1-x}PO_4$, where x denotes a substituted amount in a range of $0 \leq x \leq 0.3$ and where M1 is at least one metal element selected from the group consisting of Li, Ni, Mg, Zn, Co, Cr, Al, B, V, Si, Sn, Nb, Ta, Cu, Mo and W;
    wherein the spinel lithium manganate is at least one compound selected from the compounds represented by the formula $LiM2_xMn_{2-x}O_4$, where M2 is at least one metal element selected from the group consisting of Li, Fe, Ni, Mg, Zn, Co, Cr, Al, B, V, Si, Sn, Nb, Ta, Cu, Mo, Ti, and W, and where x denotes a substituted amount and is within a range of $0 \leq x \leq 0.3$;
    wherein x=0 in one of the olivine lithium manganese phosphate and the spinel lithium manganese when x is greater than 0 in the other one of the olivine lithium manganese phosphate and the spinel lithium manganese; and
    wherein a mixed ratio of the olivine lithium manganese phosphate in the positive electrode active material is in a range of 10 to 90 mass %.

4. The non-aqueous electrolytic secondary cell according to claim 3, wherein the electrolyte contains at least one of $LiPF_6$, $LiBF_4$, and $LiClO_4$.

5. The non-aqueous electrolytic secondary cell according to claim 3, wherein the negative electrode active material is a highly graphitized carbon material or hard carbon.

6. The non-aqueous electrolytic secondary cell according to claim 3, having a 60° C. capacity retention ratio (%) range of 75-88.

* * * * *